Patented Nov. 10, 1931

1,831,721

UNITED STATES PATENT OFFICE

ALBRECHT SCHMIDT, OF HOCHST-ON-THE-MAIN, GERMANY, ASSIGNOR, BY MESNE ASSIGNMENTS, TO WINTHROP CHEMICAL COMPANY, OF NEW YORK, N. Y., A CORPORATION OF NEW YORK

DRESSING FOR SEED GRAIN

No Drawing. Application filed January 7, 1927, Serial No. 159,739, and in Germany January 2, 1926.

In U. S. Patents No. 1,565,237 is described a process for treating seed grain with organic arsenic compounds, by which process the germinative faculty of the seeds is stimulated and noxious parasites are destroyed.

In the course of further researches, I have found that it is particularly advantageous to mix arsenical bodies, i. e. those referred to in U. S. Patent No. 1,565,237, especially those which are difficultly soluble, with other substances possessing a good wetting faculty and the property of rendering readily soluble the arsenic compounds which are otherwise soluble only with great difficulty. Substances possessing the said properties are, for instance, sulfonic acid of naphthol pitch, sulfonic acid of anthracene pitch, other suchlike sulfonated pitches or oils or the salts of these products; furthermore bodies of the type of the benzylanilinesulfonic acid or salts thereof or products of the type of the alkyl-or aralkyl-benzene (or naphthalene) sulfonic acids, which may be mono-substituted, poly-substituted or mixedly substituted, or salts thereof. If required, there may be incorporated into the mixtures of the arsenical substances with the bodies above referred to, any other fungicide agent or extender, such as salts, inert bodies or the like.

There may be used, for instance, a mixture composed of 5 parts of phenylarsineoxide, 15 parts of copper sulfate; 70 parts of sodium sulfonate of naphthol pitch and 10 parts of the sodium salt of a dibutylnaphthalenesulfonic acid, which is particularly suitable for the treatment of seeds by the immersion process, or a mixture, composed of 25 parts of copper carbonate, 5 parts of para-amino-phenyl-arsineoxide, 60 parts of the sodium salt of the sulfonated residue from anthracene and 10 parts of sodium benzylbutyl-naphthalenesulfonate, which is particularly suitable for the treatment by the dusting process.

I claim:
1. A seed grain dressing comprising an organic arsenical compound and sodium sulfonate of naphthol pitch.
2. A seed grain dressing comprising phenyl-arsineoxide, copper sulfate, sodium sulfonate of naphthol pitch and sodium salt of a dibutylnaphthalene sulfonic acid.

In testimony whereof, I affix my signature.

ALBRECHT SCHMIDT.